United States Patent
Chao et al.

(10) Patent No.: US 12,249,177 B2
(45) Date of Patent: Mar. 11, 2025

(54) RECOGNITION METHOD OF 3D VEIN PATTERN AND RECOGNITION DEVICE THEREOF

(71) Applicant: Industrial Technology Research Institute, Hsinchu (TW)

(72) Inventors: Wei-Cheng Chao, Hsinchu (TW); Chia-Hsin Chao, Hsinchu County (TW); Li-Chi Su, Yilan County (TW); Chi-Chin Yang, Hsinchu (TW); Cheng-Jhih Luo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 503 days.

(21) Appl. No.: 17/557,061

(22) Filed: Dec. 21, 2021

(65) Prior Publication Data

US 2023/0177870 A1  Jun. 8, 2023

(30) Foreign Application Priority Data

Dec. 2, 2021 (TW) .................................. 110145078

(51) Int. Cl.
- *G06V 40/145* (2022.01)
- *G06N 3/04* (2023.01)
- *G06V 10/74* (2022.01)
- *G06V 10/82* (2022.01)
- *G06V 40/20* (2022.01)

(52) U.S. Cl.
CPC ............. *G06V 40/145* (2022.01); *G06N 3/04* (2013.01); *G06V 10/761* (2022.01); *G06V 10/82* (2022.01); *G06V 40/20* (2022.01)

(58) Field of Classification Search
CPC .... G06V 40/145; G06V 10/761; G06V 10/82; G06V 40/20; G06N 3/04
See application file for complete search history.

(56) References Cited

U.S. PATENT DOCUMENTS

| | | | |
|---|---|---|---|
| 10,235,510 B2 * | 3/2019 | Yun | G06F 21/32 |
| 10,552,598 B2 * | 2/2020 | Yun | G06F 18/22 |
| 10,698,497 B2 | 6/2020 | Brennan | |
| 10,867,023 B2 * | 12/2020 | Yun | G06F 1/163 |

(Continued)

FOREIGN PATENT DOCUMENTS

| | | |
|---|---|---|
| CN | 103324274 | 9/2013 |
| CN | 111259858 | 6/2020 |

(Continued)

OTHER PUBLICATIONS

"Office Action of Taiwan Counterpart Application", issued on Oct. 12, 2022, p. 1-p. 14.

*Primary Examiner* — Utpal D Shah
(74) *Attorney, Agent, or Firm* — JCIPRNET

(57) ABSTRACT

Provided is a recognition method of 3D vein pattern including the following steps. A plurality of first light beams are emitted by a recognition device to a wrist of a user. A plurality of first reflected light beams from the wrist are received by the recognition device to form a first 3D vein pattern of the wrist. Differences between the first 3D vein pattern and a wrist vein pattern of a database are compared to identify an identity or a gesture of the user. A recognition device of 3D vein pattern is also provided.

19 Claims, 6 Drawing Sheets

(56) References Cited

U.S. PATENT DOCUMENTS

| | | | |
|---|---|---|---|
| 2002/0048014 A1* | 4/2002 | Kono | G06V 10/10 |
| | | | 356/71 |
| 2014/0016832 A1 | 1/2014 | Kong et al. | |
| 2017/0032203 A1* | 2/2017 | Chao | H04N 5/33 |
| 2017/0323141 A1* | 11/2017 | Lee | G06V 40/1318 |
| 2018/0032826 A1* | 2/2018 | Chao | G06V 10/143 |
| 2019/0087555 A1* | 3/2019 | Lee | H04N 23/10 |
| 2019/0347461 A1* | 11/2019 | Kang | G06V 40/10 |
| 2022/0197984 A1* | 6/2022 | Wright | G06N 5/01 |

FOREIGN PATENT DOCUMENTS

| | | |
|---|---|---|
| CN | 112036383 | 12/2020 |
| CN | 112183327 | 1/2021 |
| CN | 112560590 | 3/2021 |
| TW | I688878 | 3/2020 |
| TW | 202038137 | 10/2020 |
| TW | I731511 | 6/2021 |

* cited by examiner

RECOGNITION METHOD OF 3D VEIN PATTERN AND RECOGNITION DEVICE THEREOF

CROSS-REFERENCE TO RELATED APPLICATION

This application claims the priority benefits of Taiwan application serial no. 110145078, filed on Dec. 2, 2021. The entirety of the above-mentioned patent application is hereby incorporated by reference herein and made a part of this specification.

BACKGROUND

Technical Field

The present disclosure relates to a recognition method and a recognition device, and particularly relates to a recognition method of 3D vein pattern and a recognition device thereof.

Description of Related Art

Interaction with smart devices/systems has become an important part of our daily lives, as smart phones, TVs, tablet computers, game consoles, and in-vehicle systems become rapidly popularized, and being able to input is one of the most crucial tasks in the human-computer interaction. Different from the conventional technology of human-computer interaction, human-computer interaction technologies that provide intuitive and convenient interactions through voice, face, fingerprint, and gestures are developing rapidly and have a wide range of application potential.

The current human-computer interactions include technologies using visual, electromyogram (EMG), and muscle activity signals. Visual human-computer interaction uses, for example, a camera to capture images to determine the user's gestures. Although visual human-computer interaction is free from interference of physiological factors, the user must be positioned in front of the camera where ambient light is sufficient. EMG-based human-computer interaction detects the EMG signals, namely electromyography (EMG), emitted by, for example, muscle movements making different gestures to determine the user's gestures. Despite that the EMG-based human-computer interaction is not restricted by the user's position or the ambient light, it may be compromised by the user's physiological factors like perspiration. Lastly, human-computer interaction based on muscle activity signals using mechanomyography (MMG) detects the vibration signals generated by, for example, muscle contraction, to determine the user's gesture. It is true that the MMG-based human-computer interaction is not limited to the user's location, the ambient light, or the user's physiological factors, but it is quite difficult for this technology to be commercialized.

SUMMARY

The disclosure provides a recognition method of 3D vein pattern and a recognition device thereof, which are not restricted by the user's location, the ambient light, or the user's physiological factors, and its commercialization cost is low.

An embodiment of the disclosure provides a recognition method of 3D vein pattern which includes the following steps. Multiple first light beams are emitted by a recognition device to the user's wrist. Multiple first reflected light beams from the wrist are received by the recognition device to form a first 3D vein pattern of the wrist. And differences between the first 3D vein pattern and the wrist vein pattern in the database are compared to identify the identity or the gesture of the user.

An embodiment of the disclosure provides a recognition device of 3D vein pattern, which includes multiple light-emitting pixels, multiple sensing pixels, and a processor. The light-emitting pixels are disposed in an array. The sensing pixels are disposed in an array. The processor is electrically connected to the light-emitting pixels and the sensing pixels. The processor controls the light-emitting pixels to emit multiple light beams to a wrist of a user, so that the sensing pixels receive multiple reflected light beams from the wrist. The processor forms a 3D vein pattern of the wrist based on the reflected light beam and compares differences between the 3D vein pattern and a wrist vein pattern in a database to identify the identity or the gesture of the user.

Based on the above, in an embodiment of the disclosure, the recognition method or the recognition device of 3D vein pattern uses the first 3D vein pattern of the wrist obtained by the recognition device to identify the user's identity or gesture. Therefore, the recognition method or the recognition device of 3D vein pattern are not restricted by the user's location, the ambient light, or the user's physiological factors, and have advantages in commercialization.

In order to make the features and advantages of the disclosure more comprehensible, the following embodiments are described in detail in conjunction with the drawings.

DESCRIPTION OF THE EMBODIMENTS

Figure 1:
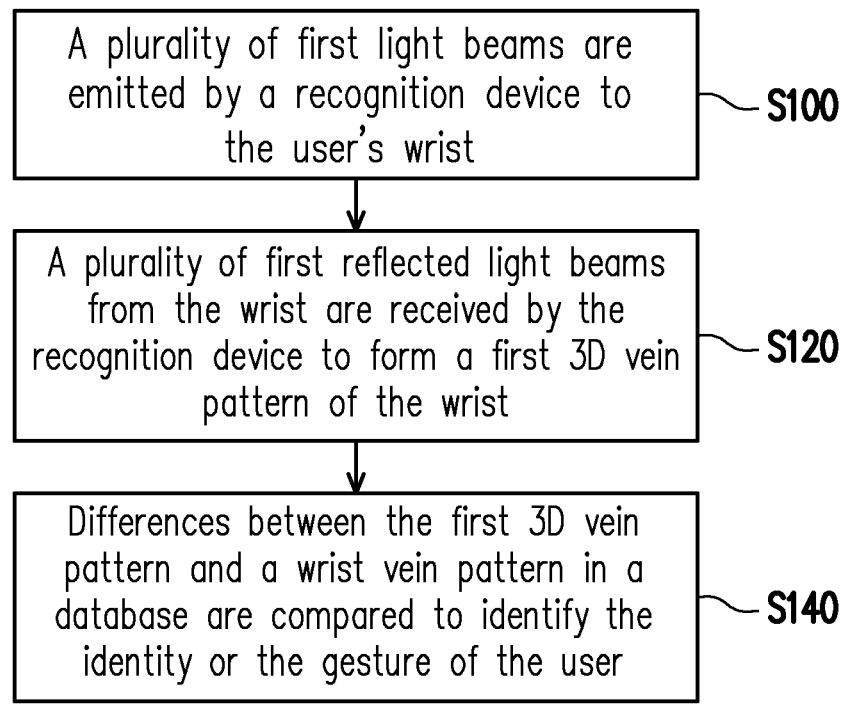
FIG. 1 is a flowchart of a recognition method of 3D vein pattern according to an embodiment of the disclosure.
Figure 2:
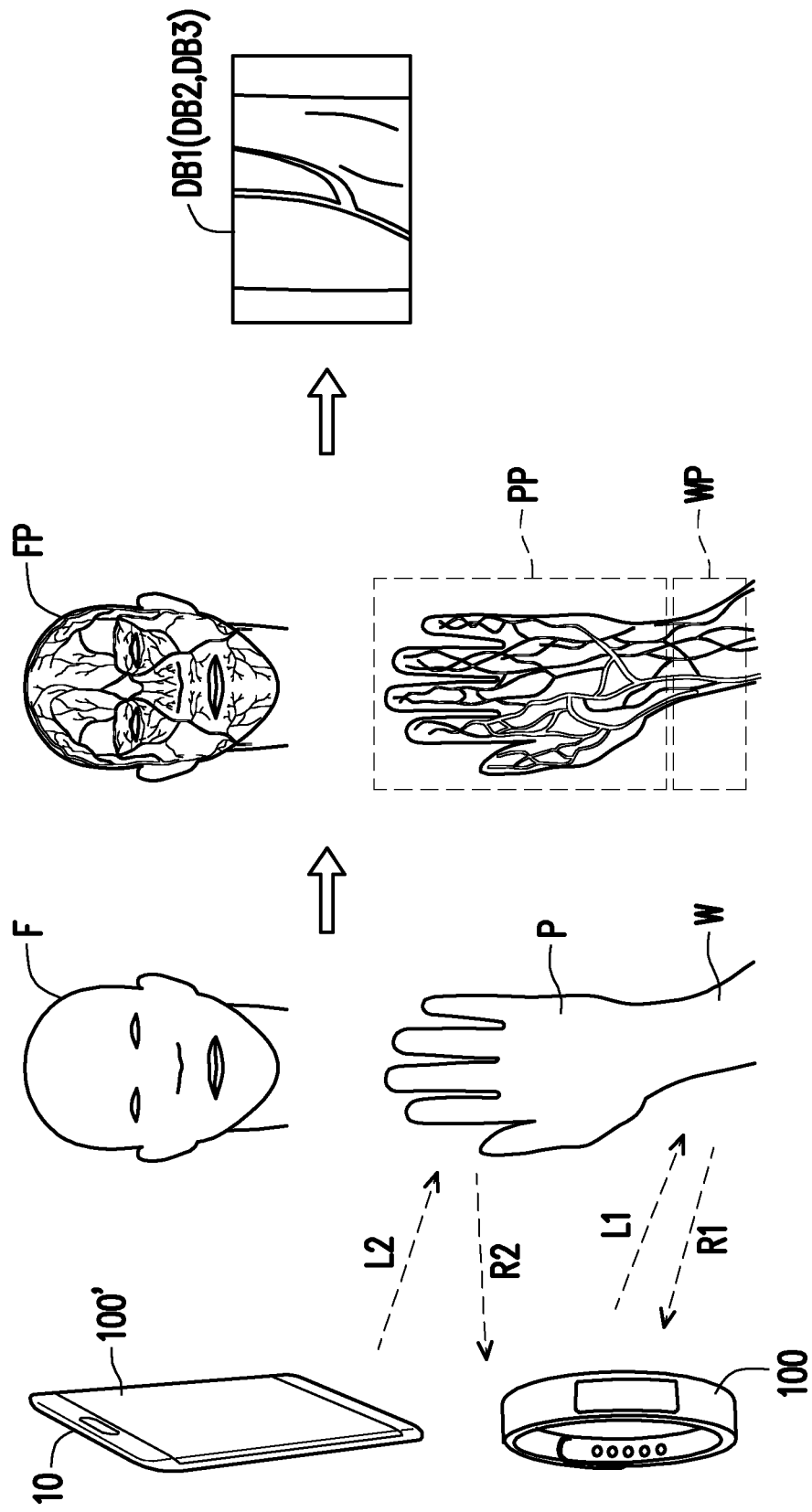
FIG. 2 is a schematic diagram of the recognition method of 3D vein pattern in obtaining a user's 3D vein pattern according to an embodiment of the disclosure.

FIG. 1 is a flowchart of a recognition method of 3D vein pattern according to an embodiment of the disclosure. FIG. 2 is a schematic diagram of a recognition method of 3D vein pattern in obtaining a user's 3D vein pattern according to an embodiment of the disclosure. Please refer to FIG. 1 and FIG. 2 at the same time. An embodiment of the disclosure provides a recognition method of 3D vein pattern, which includes the following steps. A plurality of first light beams L1 are emitted by the recognition device 100 or 100' to the user's wrist W in step S100. A plurality of first reflected light beams R1 from the wrist W are received by the recognition devices 100 and 100' to form a first 3D vein pattern WP of the wrist W in step 5120. Differences between the first 3D vein pattern WP and a wrist vein pattern in a database DB1 are compared to identify the identity or the gesture of the user in step S140.

Figure 6:
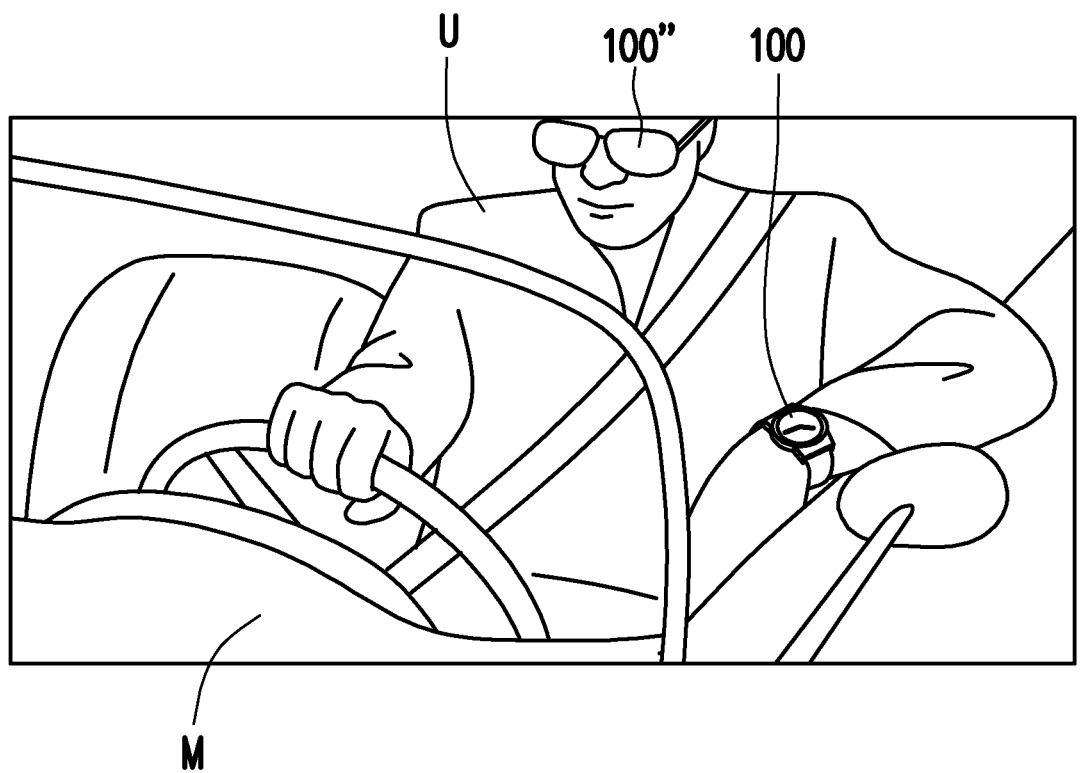
FIG. 6 is a schematic diagram of a recognition method of 3D vein pattern in unlocking a vehicle according to an embodiment of the disclosure.

The recognition device 100 of this embodiment may be a wearable device. For example, it is a wrist device such as a smart watch, so that the distance between the recognition device 100 and the wrist W is about less than 1 mm, as shown in FIG. 2. Or, for example, it is a head-mounted device such as an augmented reality display or a virtual reality display, as shown in FIG. 6 (i.e., the recognition device 100" in FIG. 6). In another embodiment, the recognition device 100' is provided in a mobile device 10. The recognition device 100' is, for example, the display of the mobile device 10, as shown in FIG. 2.

In this embodiment, the emission wavelength of the first light beam L1 falls within the range including 850±50 nm or 940±50 nm. In an embodiment, the emission wavelength of the first light beam L1 falls within a range including 850±10 nm or 940±10 nm.

In this embodiment, the recognition method of 3D vein pattern further includes the following steps. A plurality of second light beams L2 are emitted by the recognition device 100 or 100' to the face F or the palm P of the user. A plurality of second reflected light beams R2 from the face F or the palm P are received by the recognition devices 100 and 100' to form a second 3D vein pattern FP of the face F or a second 3D vein pattern PP of the palm P. Differences between the second 3D vein pattern FP and a facial vein pattern DB2 in the database, or between the second 3D vein pattern PP and a palm vein pattern DB3 in the database, are compared to identify the user's identity.

In this embodiment, the emission wavelength of the second light beam L2 falls within the range including 850±50 nm or 940±50 nm. In an embodiment, the emission wavelength of the second light beam L2 falls within a range including 850±10 nm or 940±10 nm.

In an embodiment, the recognition devices 100 and 100' that emit the first light beam L1 or the second light beam L2 and receive the first reflected light beam R1 or the second reflected light beam R2 may be the same device. For example, when the recognition device 100 is a wrist device, the recognition device 100 can obtain the first 3D vein pattern WP at any time based on the user's scenario, and complete the identification of the user's identity or gesture. Alternatively, the user emits the second light beam L2 toward the face F or the palm P to obtain the second 3D vein patterns FP and PP to complete the identification of the user's identity. For example, when the recognition device 100' is installed in the mobile device 10, the user needs to face the recognition device 100' (or the mobile device 10) toward the wrist W to emit the first light beam L1 to obtain the first 3D vein pattern WP and complete the identification of the user's identity or gesture. Or, the user emits the second light beam L2 toward the face F or the palm P to obtain the second 3D vein pattern FP or PP, and complete the identification of the user's identity. The first 3D vein pattern WP or the second 3D vein patterns FP and PP may be adapted as a pattern for identifying the user's identity. However, in an embodiment, since the first 3D vein pattern WP shows the difference between different gestures better, it has higher accuracy to use the first 3D vein pattern WP to identify the user's gesture.

For example, the wrist vein pattern DB1 in the database includes a plurality of gesture patterns, such as gestures represented by 0 (making a fist), 1, 2 (a V-sign or a sign of victory), 3, 4, 5 (an open hand), thumbs-up (with the thumb sticking out in approval), and those gesture patterns are different from one another. Therefore, the recognition method of 3D vein pattern of the embodiment of the disclosure identifies the user's gesture by comparing the similarity between the first 3D vein pattern WP and the gesture patterns in the wrist vein pattern DB1 of the database.

In one embodiment, the recognition method of 3D vein pattern further includes: in response to the first 3D vein pattern WP not matching all the wrist vein patterns DB1 in the database, adding the first 3D vein pattern WP to the wrist vein pattern DB1; and, predicting the user's identity or gesture with the convolutional neural network algorithm according to the newly added wrist vein pattern DB1. Or, in response to the second 3D vein pattern FP or PP not matching the facial vein pattern DB2 or the palm vein pattern DB3 in the database, adding the second 3D vein pattern FP or PP to the facial vein pattern DB2 or the palm vein pattern DB3; and, predicting the user's identity or gesture with the convolutional neural network algorithm according to the newly added facial vein pattern DB2 or the newly added palm vein pattern DB3. For example, assuming that a new user uses the recognition device 100, and the first 3D vein pattern WP or the second 3D vein pattern FP or PP obtained by the recognition device 100 does not match the vein patterns DB1, DB2, or DB3 in the database, the new user can choose to add his vein pattern WP, FP, or PP to the vein pattern DB1, DB2 or DB3 of the database, and predict the user's identity or gesture with the convolutional neural network algorithm to identify the identity or gesture in the future.

In addition to the above recognition method using the same recognition device 100 or 100' to obtain the first 3D vein pattern and the second 3D vein pattern, in another embodiment, different recognition devices 100 and 100' may be adapted to respectively obtain the first 3D vein pattern and the second 3D vein pattern FP or PP. For example, the recognition device 100 is adapted to obtain the first 3D vein pattern WP to identify the identity or gesture of the user, and another recognition device 100' is adapted to obtain the second 3D vein pattern FP or PP to identify the user's identity and gesture. That is, the recognition device 100 may be a first recognition device, and the recognition device 100' may be a second recognition device.

Figure 3A:
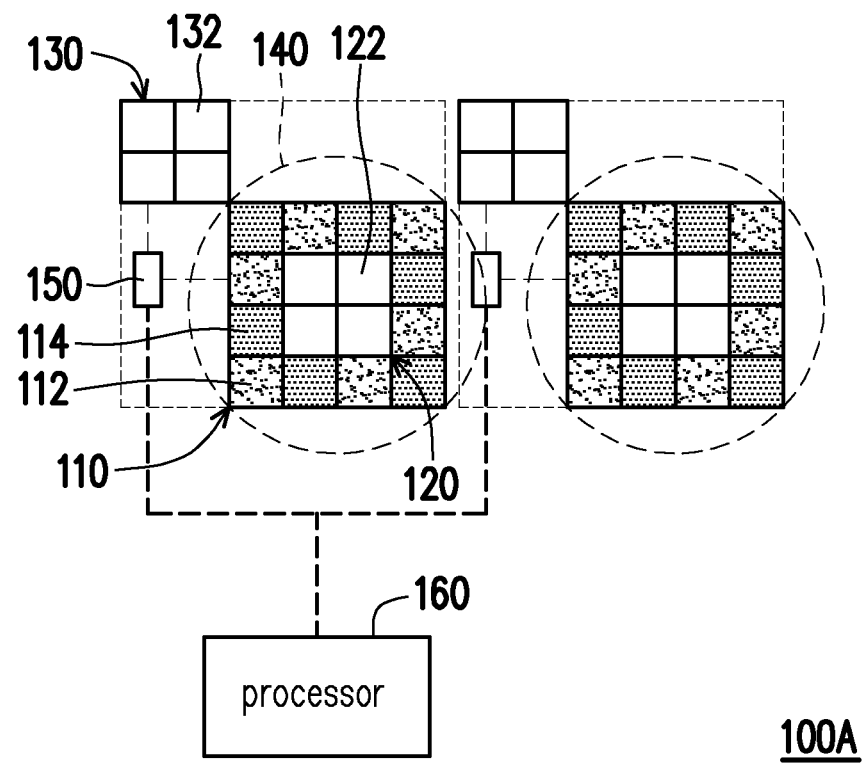
FIG. 3A is a schematic top view of the recognition device according to the first embodiment of the disclosure.
Figure 3B:
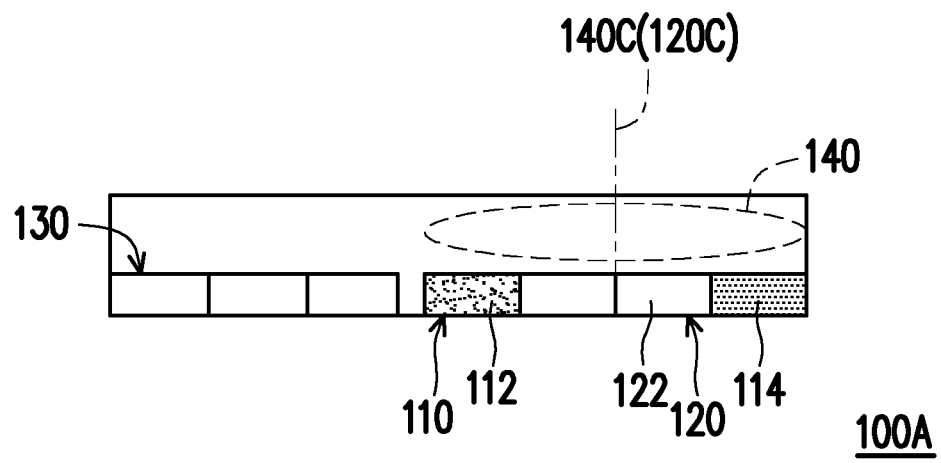
FIG. 3B is a schematic side view of the recognition device according to the first embodiment of the disclosure.

FIG. 3A is a schematic top view of the recognition device according to the first embodiment of the disclosure. FIG. 3B is a schematic side view of the recognition device according to the first embodiment of the disclosure. To show the design of the light-emitting pixel 110 and the sensing pixel 120 clearly, FIG. 3A and FIG. 3B simply show two of the light-emitting pixels 110. Please refer to FIG. 3A and FIG. 3B at the same time. In this embodiment, the recognition device 100A includes a plurality of light-emitting pixels 110 and a plurality of sensing pixels 120. The light-emitting pixels 110 are disposed in an array and adapted to emit the first light beam L1 or the second light beam L2. The sensing pixels 120 are disposed in an array and adapted to receive the first reflected light beam R1 or the second reflected light beam R2. The light-emitting pixels 110 and the sensing pixels 120 are disposed on the same plane, and each of the light-emitting pixels 110 surrounds one of the sensing pixels 120.

Each light-emitting pixel 110 of this embodiment includes a plurality of first light-emitting sub-pixels 112 and a plurality of second light-emitting sub-pixels 114. The first light-emitting sub-pixels 112 and the second light-emitting sub-pixels 114 are disposed alternately and surround one of the sensing pixels 120. The emission wavelength of the first light-emitting sub-pixel 112 falls within one of the range of 850±50 nm and the range of 940±50 nm, and the emission wavelength of the second light-emitting sub-pixel 114 falls within the other one of the range of 850±50 nm and the range of 940±50 nm. In other words, the first light-emitting sub-pixel 112 and the second light-emitting sub-pixel 114 have different emission wavelengths. In the recognition method of 3D vein pattern in an embodiment of the disclosure, the light-emitting pixel 110 is configured to surround the sensing pixel 120, and the first light-emitting sub-pixel 112 and the second light-emitting sub-pixel 114 are specifically configured to be disposed alternately and surround one of the sensing pixels 120, which helps improve the image resolution of the 3D vein patterns WP, FP, and PP to have higher accuracy.

In this embodiment, the first light-emitting sub-pixel 112 or the second light-emitting sub-pixel 114 is a light-emitting diode (LED), a micro LED, a mini led, organic light-emitting diode (OLED), or vertical-cavity surface-emitting laser (VCSEL). Moreover, the sensing pixel 120 may be photosensitive elements like a complementary metal-oxide-semiconductor (CMOS), but the disclosure is not limited thereto.

In this embodiment, the recognition device 100A further includes a plurality of collimation elements 140. The collimation elements 140 are respectively disposed on the sensing pixels 120. The central axis 120C of the sensing pixel 120 and the optical axis 140C of the collimation element 140 may coincide with each other. In this embodiment, the collimation element 140 may be a lens element (e.g., a micro lens), a pinhole element, a metalens film, or a liquid crystal element.

In this embodiment, the first reflected light beam R1 or the second reflected light beam R2 passes through the collimation element 140 and is received by the sensing pixel 120 to form the first 3D vein pattern WP or the second 3D vein pattern FP or PP. For example, each sensing pixel 120 includes a plurality of sub-sensing pixels 122, and each collimation element 140 includes a plurality of sub-collimation elements. The central axis of the sub-sensing pixel 122 and the optical axis of the sub-collimation elements coincide with each other. The first reflected light beams R1 with different angles (or the second reflected light beams R2 with different angles) respectively pass through the sub-collimation elements at different positions and are received by different sub-sensing pixels 122, thus forming a first 3D vein pattern (or a second 3D vein pattern) with light field information.

In an embodiment, the collimation element 140 is an element with variable focus, such as a liquid crystal lens, a metalens, other optical elements, or a sensor element with different focal lengths in different pixel configurations, so that the recognition device 100A is adapted to adjust its focal length corresponding to different identification parts. However, in another embodiment, the recognition device is provided with multiple collimation elements at the same time. For example, the recognition device includes a first collimation element and a second collimation element, and the first collimation element and the second collimation element are both disposed on the sensing pixel 120, wherein the first collimation element is adapted to make the first 3D vein pattern or the second 3D vein pattern carry light field information, and the second collimation element is adapted to adjust the focal length corresponding to different identification parts. Therefore, when the recognition method of 3D vein pattern of an embodiment of the disclosure adopts an element with variable focus, the recognition method is conducive to application scenarios that requires contact (for example, using a wearable recognition device 100) or is contactless (for example, using a recognition device 100' installed in a mobile device).

In this embodiment, the recognition device 100A further includes a plurality of display pixels 130. The display pixels 130 are disposed in an array. Each light-emitting pixel 110 and the surrounded sensing pixel 120 are disposed beside one of the display pixels 130. Each display pixel 130 may include a plurality of sub-display pixels 132. For example, the sub-display pixels 132 are red, green, blue, or white pixels, but the disclosure is not limited thereto. In other words, the recognition device 100A may be a display panel and may be installed in the mobile device 10 as shown in FIG. 2. Therefore, by integrating the recognition device 100A (or the recognition device 100') into a display sensor, it further optimizes and secures the human-machine interaction process. In the recognition device 100A, the size of each display pixel 130 is approximately 30 μm×30 μm, the size of each light-emitting pixel 110 is approximately 60 μm×60 μm, the size of each sensing pixel 120 is approximately 40 μm×40 μm, and the size of the pixel formed by each display pixel 130 and light-emitting pixel 110 is about 100 μm×100 μm. FIG. 3A shows that the sensing pixel 120 is provided beside the display pixel 130, but the disclosure is not limited thereto. In another embodiment, the sensing pixels 120 are disposed in an array of the display pixels 130 at intervals. That is, the ratio of the number of sensing pixels 120 to display pixels 130 may be 1:2, 1:3, etc.

In an embodiment, the recognition device 100A further includes a plurality of microchips 150 and a processor 160. The microchip 150 is electrically connected to the light-emitting pixel 110, the sensing pixel 120, the display pixel 130, and the processor 160. The processor 160 may be electrically connected to and control the light-emitting pixel 110, the sensing pixel 120, and the display pixel 130 through the microchip 150. For example, the processor 160 controls the light-emitting pixel 110 to emit a first light beam L1 or a second light beam L2, and a first 3D vein pattern WP or a second 3D vein pattern FP or PP is formed according to the signal of the first reflected light beam R1 or the second reflected light beam R2 received by the sensing pixel 120.

In one embodiment, the processor 160 includes, for example, a microcontroller unit (MCU), a central processing unit (CPU), a microprocessor, a digital signal processor (DSP), a programmable controller, a programmable logic device (PLD), other similar devices, or combinations of these devices, to which the disclosure is not limited. In addition, in one embodiment, each function of the processor 160 may be implemented as a plurality of program codes. These codes are stored in a memory, and the processor 160 executes these codes. Alternatively, in an embodiment, each function of the processor 160 is implemented as one or more circuits. The disclosure does not limit the use of software or hardware to implement the functions of the processor 160.

In this embodiment, the recognition method of 3D vein pattern further includes the following steps. The first 3D vein pattern WP or the second 3D vein pattern FP or PP is received by the processor 160.

In this embodiment, comparing the difference between the first 3D vein pattern WP, the second 3D vein pattern FP, or the second 3D vein pattern PP and the wrist vein pattern WP, the facial vein pattern FP, or the palm vein pattern PP in the database includes the following step. The contrast of the first 3D vein pattern WP or the second 3D vein pattern FP or PP is enhanced by the processor 160 with an image processing operation. The differences between the enhanced first 3D vein pattern WP or the enhanced second 3D vein pattern FP or PP and the database are compared by the processor 160 with the convolutional neural networks (CNN) algorithm. The convolutional neural network algorithm includes Keras or Tensorflow.

In this embodiment, comparing the differences between the enhanced first 3D vein pattern WP and the database by the processor 160 with the convolutional neural network includes the following steps. The similarity between the enhanced first 3D vein pattern WP and the gesture patterns in the wrist vein pattern DB1 of the database are compared to identify the user's gesture. Enhancing the contrast of the first 3D vein pattern WP or the second 3D vein pattern FP or PP further improves the accuracy of the recognition method of 3D vein pattern of the embodiment of the disclosure.

Based on the above, in an embodiment of the disclosure, the recognition method or the recognition devices 100 and 100' of 3D vein pattern use the recognition devices 100 and 100' to obtain the first 3D vein pattern WP of the wrist W, then compare the differences between the first 3D vein pattern WP and the wrist vein pattern DB1 in the database to identify the identity or gesture of the user. Therefore, the recognition method of 3D vein pattern has the advantages of not being restricted by the user's location, the ambient light, and the user's physiological factors. Using the first light beam L1 of near-infrared light as a sensing light beam is also beneficial to commercialization. Moreover, the use of infrared light vein sensing as the basis for identifying identities or gestures also gives the recognition method of 3D vein pattern of the embodiment of the disclosure advantages like high recognition accuracy, high security, fast recognition speed, low cost, and/or high privacy. The recognition devices 100 and 100' have the advantages of having a small size and may be accepted by the user easily. In addition, the recognition device 100 may be a wearable device, or the recognition device 100' may be installed in the mobile device 10, so that the recognition method of 3D vein pattern of the embodiment of the disclosure has the advantage of being easier to use.

In addition, the recognition method or the recognition devices 100 and 100' of 3D vein pattern of the embodiment of the disclosure may further use the recognition devices 100 and 100' to obtain the second 3D vein patterns FP and PP on the face F or the palm P, then compare the differences between the second 3D vein pattern FP or PP and the facial vein pattern DB2 or the palm vein pattern DB3 in the database to identify the identity of the user, which further improves the convenience in use.

Figure 4:
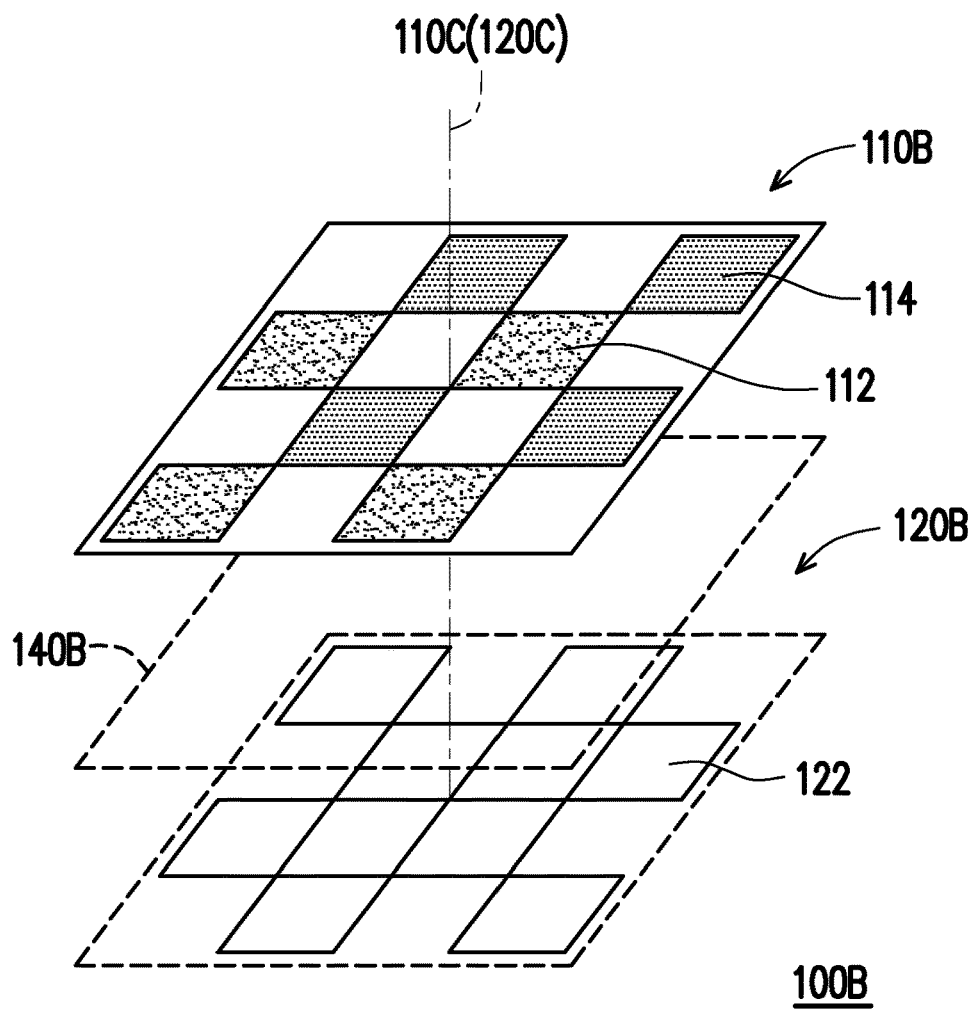
FIG. 4 is a schematic diagram of a recognition device according to a second embodiment of the disclosure.

FIG. 4 is a schematic diagram of a recognition device according to a second embodiment of the disclosure. To illustrate the design of the light-emitting pixel 110B and the sensing pixel 120B clearly, FIG. 4 simply shows one of the light-emitting pixels 110B. In FIG. 4, the recognition device 100B is similar to the recognition device 100A in FIG. 3A, and their main differences are described as follows. In this embodiment, the recognition device 100B includes a plurality of light-emitting pixels 110B and a plurality of sensing pixels 120B. The light-emitting pixels 110B are disposed in an array and adapted to emit a first light beam L1 or a second light beam L2. The sensing pixels 120B are disposed in an array and adapted to receive the first reflected light beam R1 or the second reflected light beam R2. The light-emitting pixels 110B are respectively disposed on the sensing pixels 120B, and the central axis 110C of the light-emitting pixels 110B and the central axis 120C of the sensing pixels 120B are coincident with each other. The distance between the light-emitting pixel 110B and the sensing pixel 120B along the central axis 110C is approximately less than 2.5 mm.

In this embodiment, each light-emitting pixel 110B includes a plurality of first light-emitting sub-pixels 112 and a plurality of second light-emitting sub-pixels 114 disposed alternately. Each sensing pixel 120B includes a plurality of sub-sensing pixels 122 disposed alternately. The projections of the first light-emitting sub-pixel 112 and the second light-emitting sub-pixel 114 along the central axis 110C of the light-emitting pixel 110B and the sub-sensing pixels 122 are disposed alternately. In addition, the collimation element 140b is preferably configured to be located between the sensing pixel 120B and the light-emitting pixel 110B, so that the area of the recognition device 100B (perpendicular to the central axis 110C) is small. At this time, the recognition device 100B is suitable for being installed in a system that requires a small thickness, such as an access control system. The remaining advantages of the recognition method of 3D vein pattern using the recognition device 100B are similar to the advantages of the recognition device 100A, and the same description is thus not repeated here.

Figure 5:
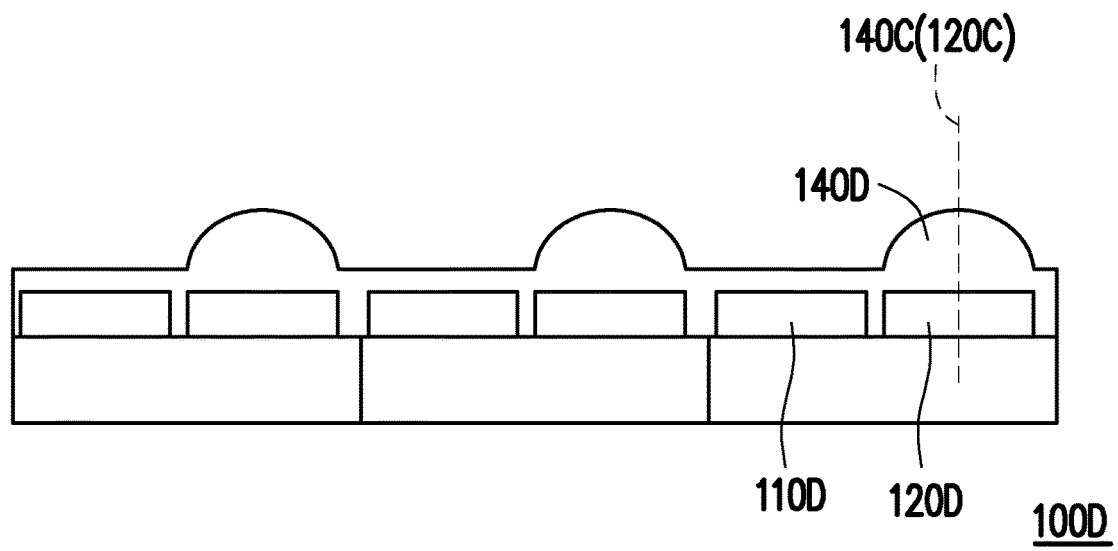
FIG. 5 is a schematic diagram of a recognition device according to a third embodiment of the disclosure.

FIG. 5 is a schematic diagram of a recognition device according to a third embodiment of the disclosure. In FIG. 5, the recognition device 100D is similar to the recognition device 100A in FIG. 3A, and their main differences are as follows. In this embodiment, the light-emitting pixels 110D and the sensing pixels 120D of the recognition device 100D are alternately disposed and are on the same plane. Moreover, the collimation elements 140D are respectively disposed on the sensing pixels 120D, and the central axis 120C of the sensing pixel 120D and the optical axis 140C of the collimation element 140D coincide with each other. Due to the design in which the light-emitting pixels 110D and the sensing pixels 120D of the recognition device 100D are disposed on the same plane, the thickness of the recognition device 100D is small along the optical axis 140C. The remaining advantages of the recognition method of 3D vein pattern using the recognition device 100D are similar to the advantages of using the recognition device 100A, and the same description is thus not repeated here.

FIG. 6 is a schematic diagram of a recognition method of 3D vein pattern in unlocking a vehicle using according to an embodiment of the disclosure. In the embodiment of FIG. 6, the recognition method of 3D vein pattern further includes the following steps. The identity of a user U is identified by the recognition device 100 or 100". After confirming the identity of the user U, a vehicle M (for example, the car or locomotive in FIG. 6), a mobile device, an access control, or a mobile payment is unlocked. That is to say, in the recognition method of 3D vein pattern according to the embodiment of the disclosure, the recognition device 100 or 100" may be adapted as a medium for identity authentication to be used as a biological key for vehicles, mobile devices, access control, mobile payment, etc.

Figure 7:
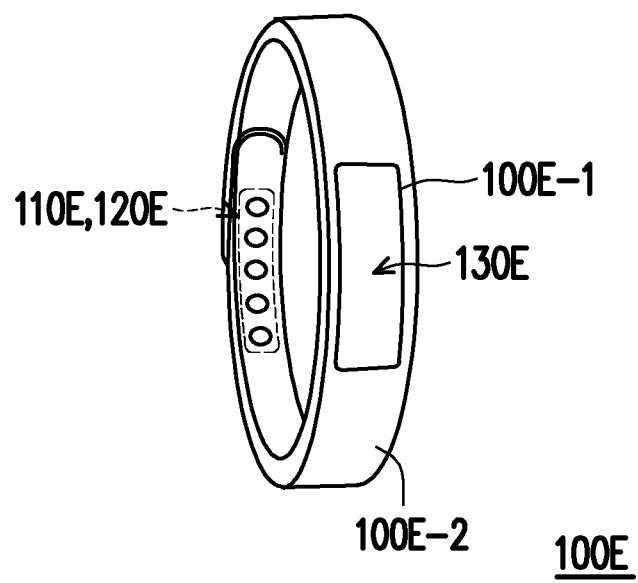
FIG. 7 is a schematic diagram of a recognition device according to a fourth embodiment of the disclosure.

FIG. 7 is a schematic diagram of a recognition device according to a fourth embodiment of the disclosure. In FIG. 7, the recognition device 100E is similar to the recognition device 100A in FIG. 3A, and their main differences are as follows. In this embodiment, the recognition device 100E is a wrist device that has a header area 100E-1 and a wristband area 100E-2. A display pixel 130E is disposed in the header area 100E-1. The light-emitting pixels 110E and the sensing pixels 120E are disposed in the wristband area 100E-2. The arrangement of the display pixels 130E may be similar to the arrangement of the display pixels 130 in the recognition device 100A, but the disclosure is not limited thereto. The arrangement or configuration of the light-emitting pixels 110E and the sensing pixels 120E may be similar to the light-emitting pixels 110 and the sensing pixels 120 in the recognition device 100A or may be similar to the light-emitting pixels 110B and the sensing pixels 120B in the recognition device 100B, but the disclosure is not limited thereto. Since the light-emitting pixel 110E and the sensing pixel 120E in the recognition device 100E are disposed in the wristband area 100E-2, the recognition device 100E is suitable for recognizing the vein pattern on the side of the wrist at the palm of the hand (for example, the first 3D vein pattern WP).

Figure 8:
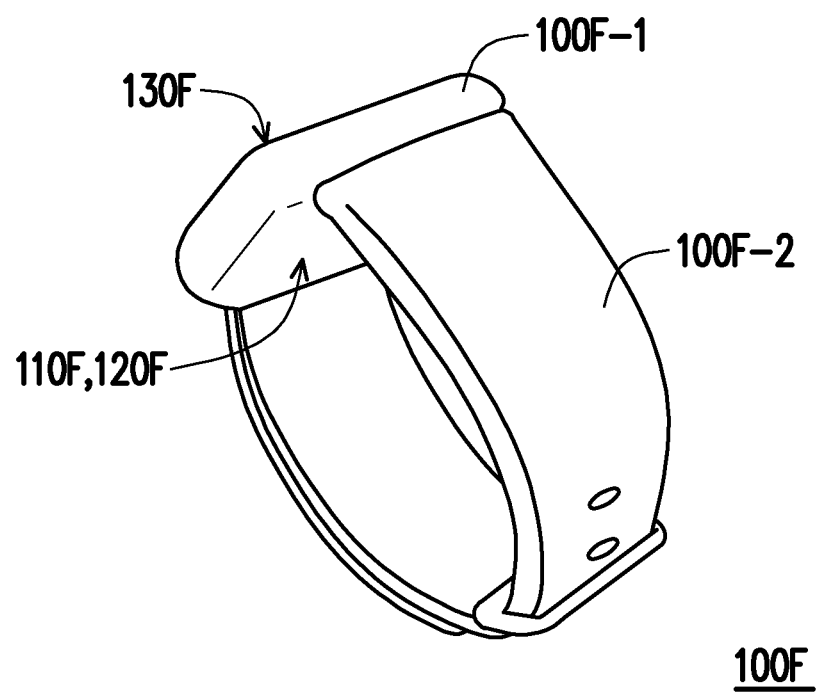
FIG. 8 is a schematic diagram of a recognition device according to a fifth embodiment of the disclosure.

FIG. 8 is a schematic diagram of a recognition device according to a fifth embodiment of the disclosure. In FIG. 8, the recognition device 100F is similar to the recognition device 100E in FIG. 7, and their main differences are as follows. In this embodiment, the recognition device 100F is a wrist device that has a header area 100F-1 and a wristband area 100E-2. The display pixel 130F is disposed on one side of the header area 100F-1, and the light-emitting pixel 110F and the sensing pixel 120F are disposed on the other side of the header area 100E-1 opposite to the display pixel 130F. Therefore, the recognition device 100F is suitable for recognizing the vein pattern on the side of the wrist at the back of the hand (for example, the first 3D vein pattern WP).

In summary, in an embodiment of the disclosure, the recognition method or the recognition device of 3D vein pattern adapts the recognition device to obtain a first 3D vein pattern of the wrist, then compares the differences between the first 3D vein pattern and the wrist vein patterns in the database to identify the identity or gesture of the user. Therefore, the recognition method of 3D vein pattern has the advantages of not being restricted by the user's location, the ambient light, and the user's physiological factors. Moreover, the use of infrared light vein sensing as the basis for identifying identities or gestures is also conducive to commercialization, and it gives the recognition method or the recognition device of 3D vein pattern of the embodiment of the disclosure advantages like high recognition accuracy, high security, fast recognition speed, low cost, high privacy, small size of the recognition device, and/or easy acceptance by users.

Although the disclosure has been disclosed in the above embodiments, they are not meant to limit the disclosure. Anyone with common, general knowledge in the art can make changes and modifications without departing from the spirit and scope of the disclosure. The scope of the disclosure shall be determined by the scope of the claims.

What is claimed is:

1. A recognition method of 3D vein pattern, comprising:
   emitting a plurality of first light beams by a recognition device to a wrist of a user;
   receiving a plurality of first reflected light beams from the wrist by the recognition device to form a first 3D vein pattern of the wrist;
   comparing differences between the first 3D vein pattern and a wrist vein pattern in a database to identify an identity or a gesture of the user;
   in response to the first 3D vein pattern not matching all of the wrist vein pattern in the database, adding the first 3D vein pattern to the wrist vein pattern; and
   predicting the identity or the gesture of the user with a convolutional neural network algorithm according to the newly added wrist vein pattern.

2. The recognition method of 3D vein pattern according to claim 1, further comprising:
   emitting a plurality of second light beams by the recognition device to a face or a palm of the user;
   receiving a plurality of second reflected light beams from the face or the palm by the recognition device to form a second 3D vein pattern of the face or the palm; and
   comparing differences between the second 3D vein pattern and a facial vein pattern or a palm vein pattern in the database to identify the identity of the user.

3. The recognition method of 3D vein pattern according to claim 2 further comprising:
   in response to the second 3D vein pattern not matching all of the facial vein pattern or the palm vein pattern in the database, adding the second 3D vein pattern to the facial vein pattern or the palm vein pattern; and
   predicting the identity of the user with the convolutional neural network algorithm according to the newly added facial vein pattern or the newly added palm vein pattern.

4. The recognition method of 3D vein pattern according to claim 2, wherein comparing differences between the first 3D vein pattern or the second 3D vein pattern and the wrist vein pattern, the facial vein pattern, or the palm vein pattern in the database comprises:
   receiving the first 3D vein pattern or the second 3D vein pattern by a processor;
   enhancing a contrast of the first 3D vein pattern or the second 3D vein pattern by the processor with an image processing operation; and
   comparing differences between the enhanced first 3D vein pattern or the enhanced second 3D vein pattern and the database by the processor with the convolutional neural network algorithm.

5. The recognition method of 3D vein pattern according to claim 4, wherein comparing differences between the enhanced first 3D vein pattern and the database by the processor with the convolutional neural network algorithm comprises:
   comparing a similarity between the enhanced first 3D vein pattern and a plurality of gesture patterns in the wrist vein pattern of the database to identify the gesture of the user.

6. The recognition method of 3D vein pattern according to claim 2, further comprising:
   after confirming the identity of the user, unlocking a vehicle, a mobile device, an access control, or a mobile payment.

7. A recognition device of 3D vein pattern, comprising:
   a plurality of light-emitting pixels, disposed in an array;
   a plurality of sensing pixels, disposed in an array; and
   a processor, electrically connected to the light-emitting pixels and the sensing pixels,
   wherein the processor controls the light-emitting pixels to emit a plurality of light beams to a wrist of a user, so that the sensing pixels receive a plurality of reflected light beams from the wrist, and the processor forms a 3D vein pattern of the wrist based on the reflected light beams and compares differences between the 3D vein pattern and a wrist vein pattern in a database to identify an identity or a gesture of the user,
   wherein in response to the first 3D vein pattern not matching all of the wrist vein pattern in the database, the processor adds the first 3D vein pattern to the wrist vein pattern; and
   the processor predicts the identity or the gesture of the user with a convolutional neural network algorithm according to the newly added wrist vein pattern.

8. The recognition device of 3D vein pattern according to claim 7, wherein the light-emitting pixels and the sensing pixels are disposed on a same plane, and each of the light-emitting pixels surrounds one of the sensing pixels.

9. The recognition device of 3D vein pattern according to claim 8, wherein each of the light-emitting pixel comprises:
a plurality of first light-emitting sub-pixels; and
a plurality of second light-emitting sub-pixels,
wherein the first light-emitting sub-pixels and the second light-emitting sub-pixels are disposed alternately and surround one of the sensing pixels.

10. The recognition device of 3D vein pattern according to claim 9, wherein an emission wavelength of the first light-emitting sub-pixels falls within one of a range of 850±50 nm and a range of 940±50 nm, and an emission wavelength of the second light-emitting sub-pixels falls within an other one of the range of 850±50 nm and the range of 940±50 nm.

11. The recognition device of 3D vein pattern according to claim 8, further comprising:
a plurality of collimation elements, respectively disposed on the sensing pixels,
wherein central axis of the sensing pixels coincide with optical axis of the collimation elements.

12. The recognition device of 3D vein pattern according to claim 8, further comprising:
a plurality of display pixels, disposed in an array,
wherein each of the light-emitting pixels and the surrounded sensing pixels are disposed beside one of the display pixels.

13. The recognition device of 3D vein pattern according to claim 7, wherein the light-emitting pixels are respectively disposed on the sensing pixels, and central axis of the light-emitting pixels respectively coincide with central axis of the sensing pixels.

14. The recognition device of 3D vein pattern according to claim 13, wherein
each of the light-emitting pixels comprise a plurality of first light-emitting sub-pixels and a plurality of second light-emitting sub-pixels are disposed alternately;
each of the sensing pixels comprise a plurality of sub-sensing pixels disposed alternately; and
projections of the first light-emitting sub-pixels and the second light-emitting sub-pixels along central axis of the light-emitting pixels are disposed alternately with the sub-sensing pixels.

15. The recognition device of 3D vein pattern according to claim 13, further comprising:
a plurality of collimation elements, respectively disposed on the sensing pixels,
wherein the collimation elements are located between the sensing pixels and the light-emitting pixels.

16. The recognition device of 3D vein pattern according to claim 7, wherein the light-emitting pixels and the sensing pixels are disposed alternately and are on a same plane.

17. The recognition device of 3D vein pattern according to claim 16, further comprising:
a plurality of collimation elements, respectively disposed on the sensing pixels,
wherein central axis of the sensing pixels coincide with optical axis of the collimation elements.

18. The recognition device of 3D vein pattern according to claim 7, wherein the recognition device is a wrist device and has a header area and a wristband area, the header area is connected to the wristband area, and the wrist device further comprises:
a plurality of display pixels, disposed in an array and disposed in the header area;
wherein the light-emitting pixels and the sensing pixels are disposed in the wristband area.

19. The recognition device of 3D vein pattern according to claim 7, wherein the recognition device is a wrist device and has a header area and a wristband area, the header area is connected to the wristband area, and the wrist device further comprises:
a plurality of display pixels, disposed in an array and disposed on one side of the header area;
wherein the light-emitting pixels and the sensing pixels are disposed on an other side of the header area opposite to the display pixels.

* * * * *